June 13, 1933. W. F. HEROLD ET AL 1,914,204
SWIVEL BEARING
Filed Aug. 17, 1931 5 Sheets-Sheet 1
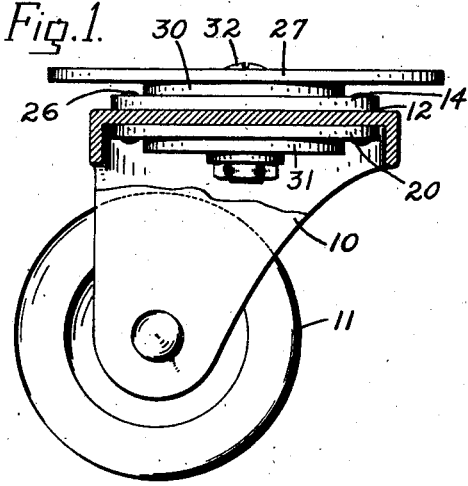
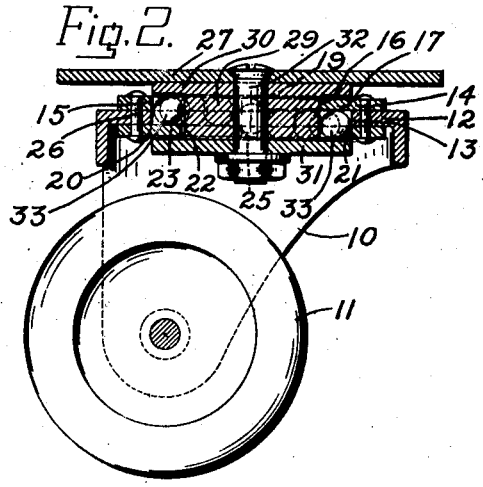
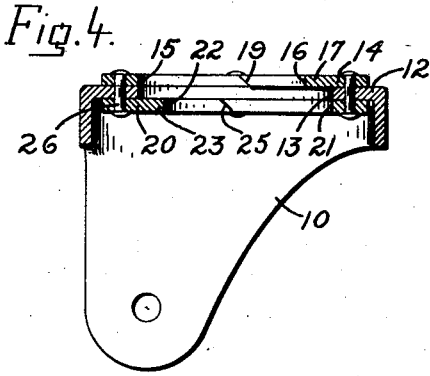
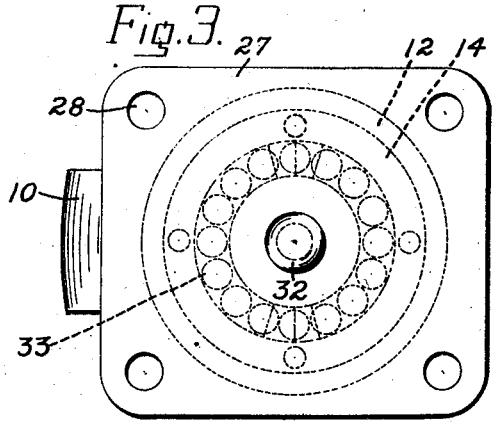
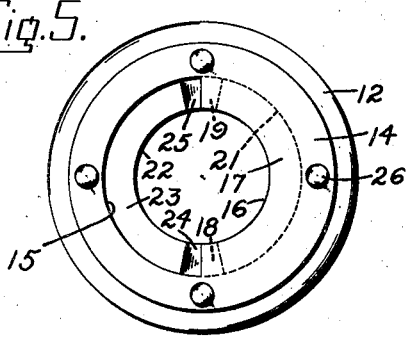
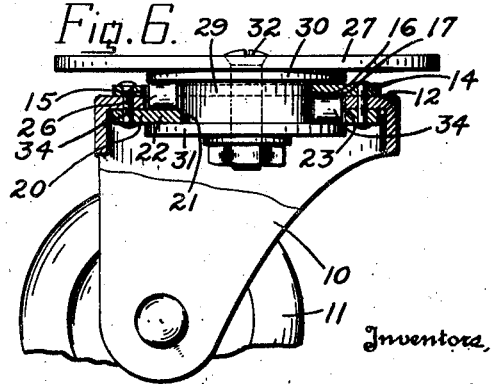
Inventors,
WALTER F. HEROLD and
EMIL E. KNITTEL
By
Attorney June 13, 1933. W. F. HEROLD ET AL 1,914,204
SWIVEL BEARING
Filed Aug. 17, 1931 5 Sheets-Sheet 2
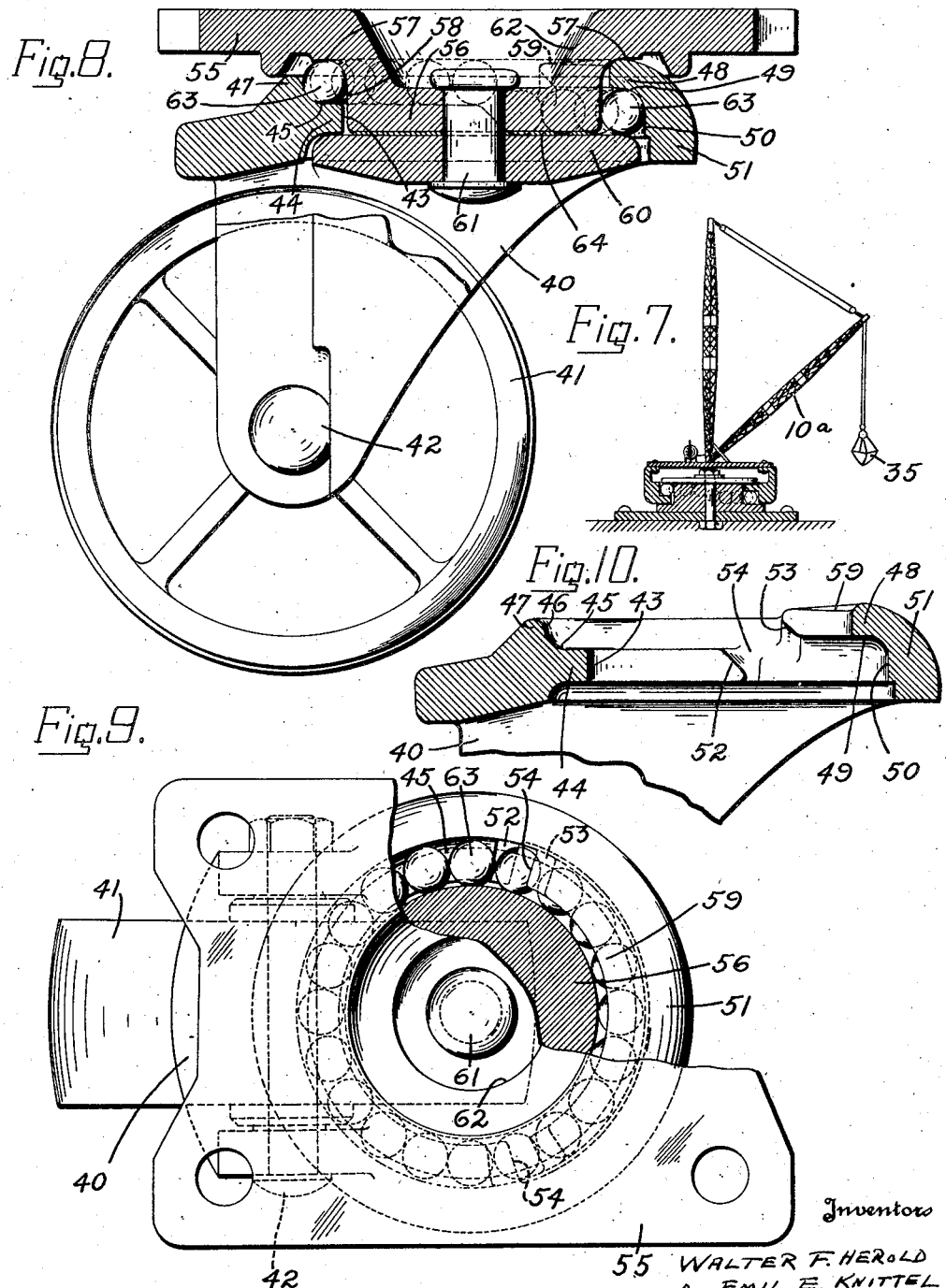

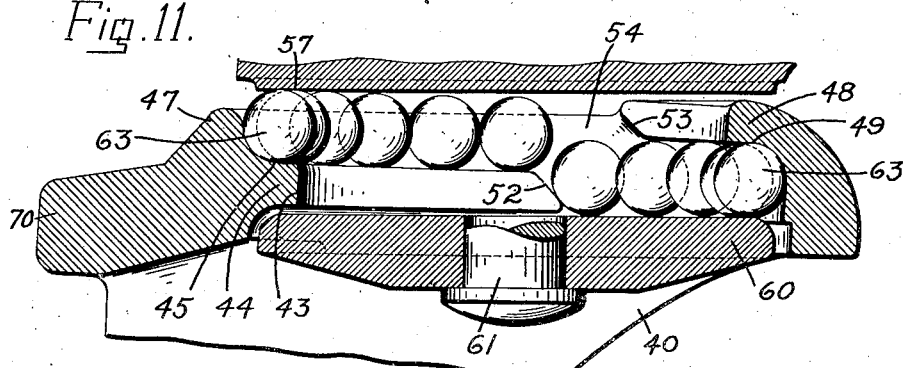
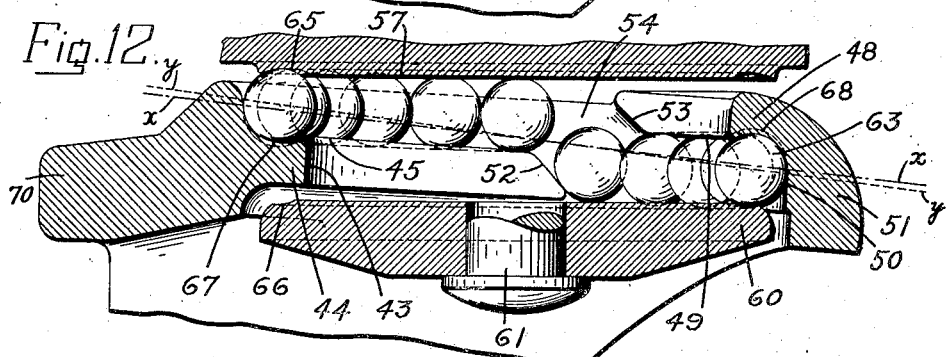
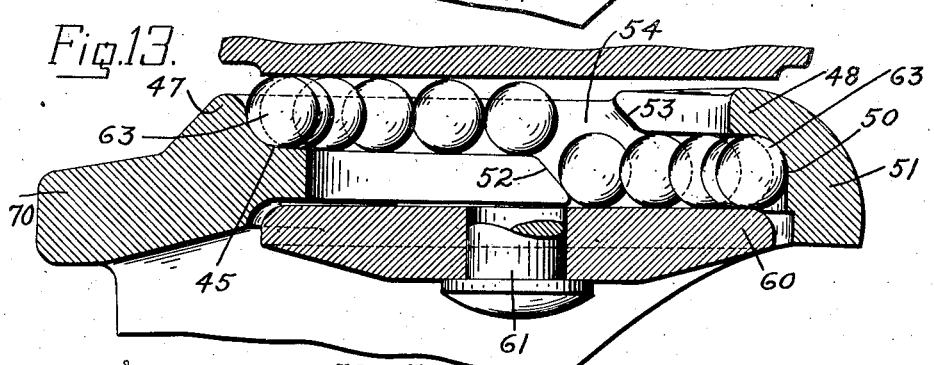
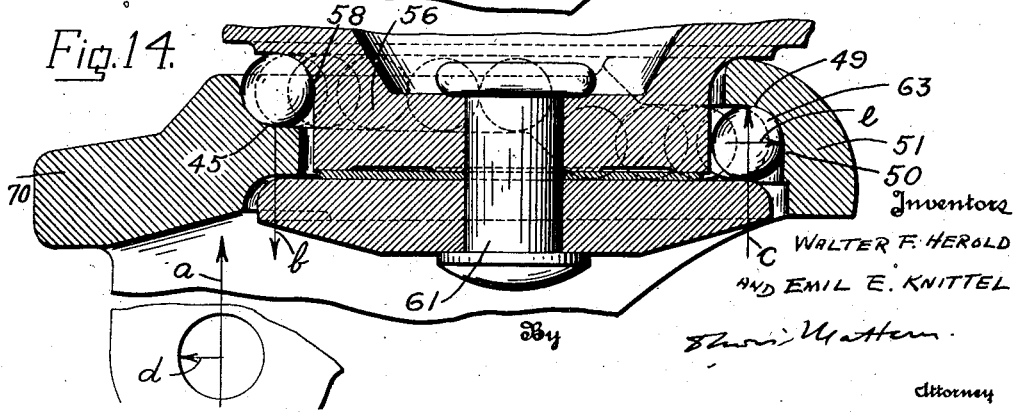

June 13, 1933.  W. F. HEROLD ET AL  1,914,204
SWIVEL BEARING
Filed Aug. 17, 1931  5 Sheets-Sheet 4
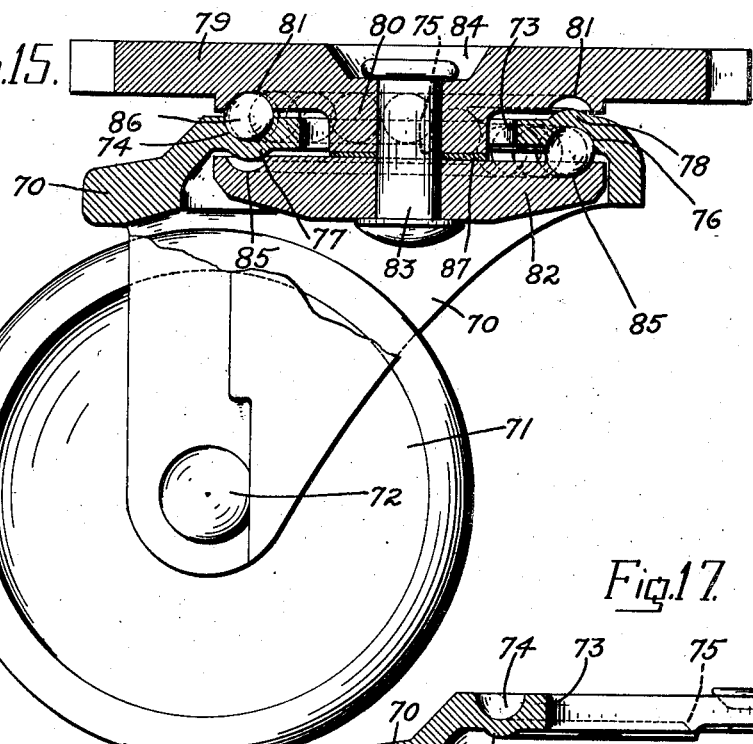
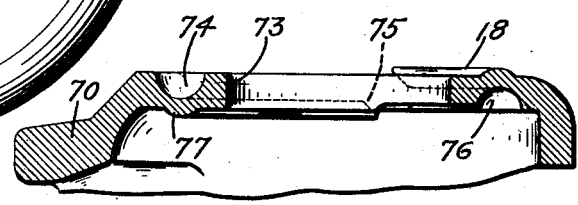
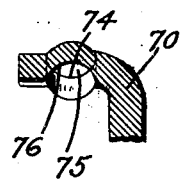
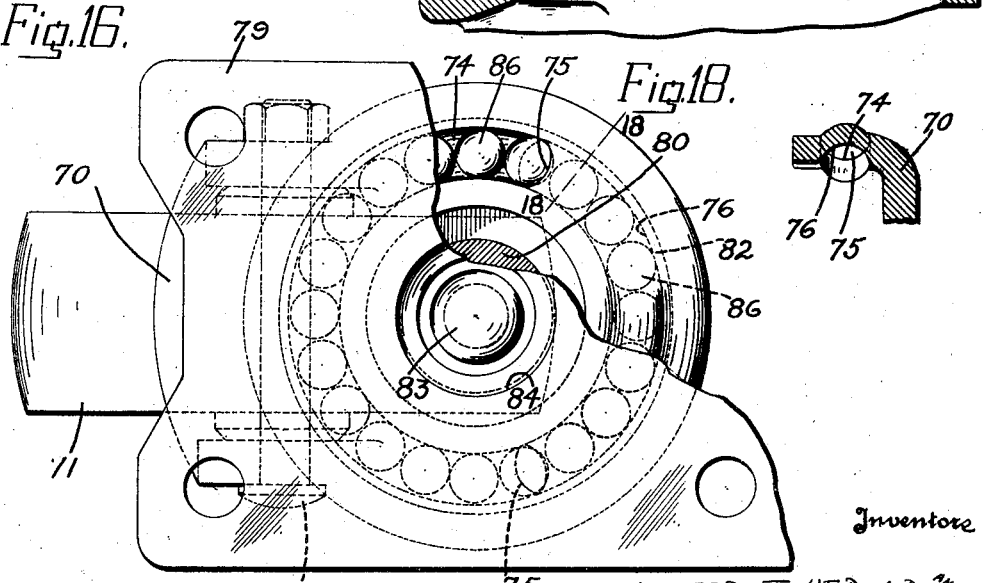
Inventors
WALTER F. HEROLD and
EMIL E. KNITTEL
By
Attorney June 13, 1933.  W. F. HEROLD ET AL  1,914,204
SWIVEL BEARING
Filed Aug. 17, 1931  5 Sheets-Sheet 5
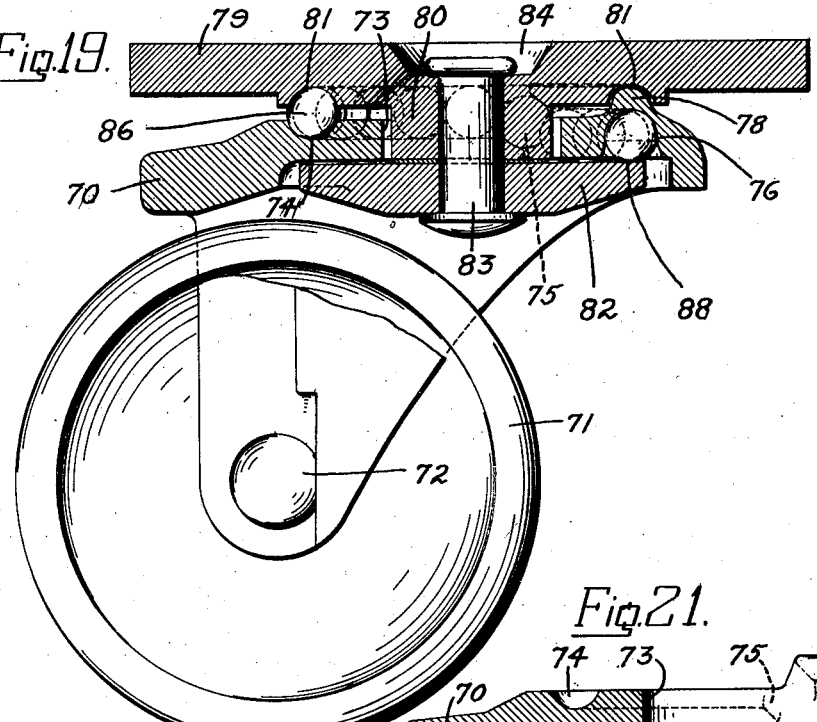
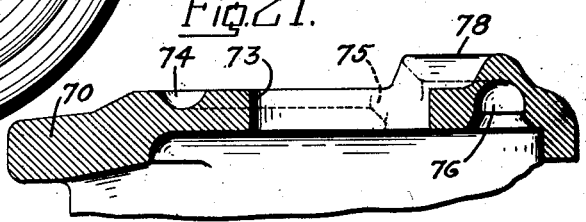
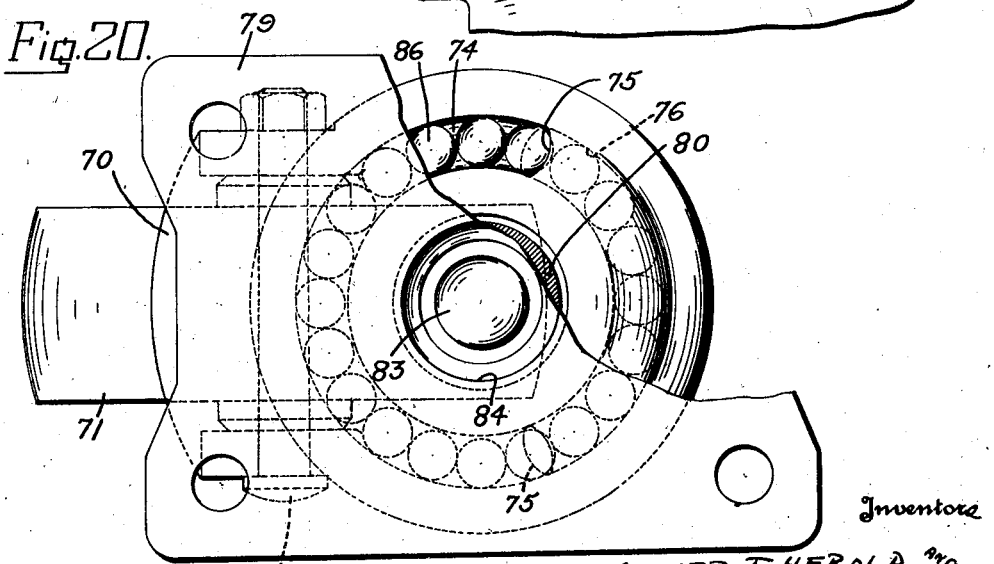
Inventors
WALTER F. HEROLD and
EMIL E. KNITTEL
Attorney Patented June 13, 1933

1,914,204

UNITED STATES PATENT OFFICE

WALTER F. HEROLD AND EMIL E. KNITTEL, OF BRIDGEPORT, CONNECTICUT, ASSIGNORS TO THE BASSICK COMPANY, OF BRIDGEPORT, CONNECTICUT, A CORPORATION OF CONNECTICUT

SWIVEL BEARING

Application filed August 17, 1931. Serial No. 557,432.

The present invention relates generally to swivel bearings, and more particularly to swivel thrust bearings, subjected to eccentric loading as used, for example in casters, cranes, etc., and has for an object to provide an improved ball-bearing swivel construction, the present application being a continuation, in part, of our application for casters, Serial Number 379,122, filed July 18, 1929. In a caster, for example, the axis of the wheel is at one side of the vertical swiveling axis, so that the load is offset, with the result that there is an upward thrust at one side of the caster horn and a downward thrust at the other side exerting a tilting action and unequal load on the bearing. In a crane the weight is at one side of the swiveling axis. Swivel bearings for casters and other structures have heretofore been constructed in which two or more ball-races were employed to take care of this double thrust, but in those constructions in which only a single ball-race is employed the double thrust is not taken up by the balls, with the result that swiveling is impaired and the parts are subject to great wear because of friction.

It is proposed in the exemplary illustrated embodiments of the present invention to provide a swivel bearing having a single set of balls arranged to travel in a two-level race, the balls moving from one level to the other to take their positions on opposite sides of the eccentrically loaded member, and so arranged as to take thrust in one direction at one side and in the opposite direction at the other side.

In moving from one level to the other it is desirable to relieve the balls of load pressure so that there will be no impairment of their free movement, and it is an object of the invention to provide a construction in which the balls will not be under load at the points where they move from one level to the other, and further in which this arrangement will be maintained under all conditions of use, such as wear, variations in adjustments, etc.

It is a further object to provide a swivel bearing in which the bearing surfaces will be in substantially proportionate relation to the uneven eccentric load distributed at opposite sides of the swiveling axis, so that uneven wear resulting from this condition will be compensated for.

It is a further object to provide a construction in which the two-level segmental race is so arranged that either one or both levels, as desired, take side thrusts in all directions, and the two-level segmental race being also adapted to take vertical thrust, the vertical thrust being in one direction at one side and in the opposite direction at the other side.

In moving from one level to the other it is desirable to relieve the balls of load pressure so that there will be no impairment of their free movement, and to this end it is proposed in certain embodiments to pass them through passages in the horn top where they will be entirely out of contact with any relatively moving bearing surfaces.

In the drawings:

Fig. 1 is a side elevation, partly broken away, showing a swivel bearing, according to one embodiment of the invention, incorporated, by example, in a caster.

Fig. 2 is a vertical sectional view thereof.

Fig. 3 is a plan view.

Fig. 4 is a sectional view of the horn top employed.

Fig. 5 is a plan view thereby.

Fig. 6 is a sectional view of a modified form, in which roller-bearings are employed, instead of the balls as employed in the embodiment shown in Figs. 1 to 5.

Fig. 7 is a sectional view partly in side elevation of a crane embodying the invention.

Fig. 8 is a vertical sectional view, partly in side elevation showing a modification of the invention, also incorporated, for example, in a caster.

Fig. 9 is a plan view thereof, partly broken away, and in horizontal section.

Fig. 10 is a vertical sectional view of the upper end of the caster horn.

Fig. 11 is an enlarged diagrammatic sectional view with the center part broken away, showing the arrangement of the balls and ball race, and wherein the elevation between the upper and lower levels is modified with respect to the form shown in Figs. 8 to 10.

Fig. 12 is a similar enlarged diagrammatic sectional view of the swivel-bearing as illustrated in Figs. 8 to 10, and showing the effect of wear.

Fig. 13 is a similar enlarged diagrammatic sectional view showing the effect of loose adjustment of the parts.

Fig. 14 is a enlarged diagrammatic sectional view, showing the relation of forces to the swivel bearing, as incorporated in a caster.

Fig. 15 is a vertical sectional view, partly in side elevation of a further modification of the invention, also shown for example, incorporated in a caster.

Fig. 16 is a plan view thereof, partly broken away and in horizontal section.

Fig. 17 is a vertical sectional view of the upper end of the caster horn.

Fig. 18 is a fragmentary sectional view, taken along the line 18—18 of Fig. 16.

Fig. 19 is a vertical sectional view partly in side elevation of a still further modified form of the invention shown, for example, incorporated in a caster.

Fig. 20 is a plan view thereof, partly broken away and in horizontal section.

Fig. 21 is a vertical sectional view of the upper end of the caster horn.

Similar reference characters indicate corresponding parts throughout the several figures of the drawings.

Referring to the drawings, the swivel bearing according to one embodiment of our invention is shown incorporated in a caster, which comprises a horn 10, in which a wheel 11 is mounted. The horn is provided in its upper flat portion 12 with a relatively large circular aperture 13, which is adapted, as will presently more fully appear, to define the outer periphery of the ball-race. At the upper side of the horn top there is provided a circular plate 14 having an opening in the center, a semi-circular portion 15 of which registers with half of the aperture 13 at the side of the pivotal axis at which the axis of the wheel is disposed, while the other semi-circular portion 16 is of substantially smaller radius and forms a projecting portion 17 on the plate extending inwardly with respect to the aperture 13, the ends 18 and 19 of this projecting portion being beveled at the under side. A similar plate 20 is provided at the under side of the horn top, but in reverse relation to the plate 14, and includes an opening having a semi-circular portion 21 registering with the half of the aperture 13 at the opposed side of the pivotal axis from that at which the axis of the wheel is disposed, and a smaller diameter semi-circular portion 22 at the wheel axis side, forming a projecting portion 23 on the plate, the ends 24 and 25 of which are beveled at the upper side. The plates 14 and 20 are secured to the horn top by rivets 26, or they may be spot-welded, or otherwise suitably secured.

In the plan view, Fig. 5, it will be seen that the smaller diameter portions 16 and 22 define a circular opening, while the larger diameter portions 15 and 21 define a circular race-way disposed at an upper level above the projecting portion 23 of the lower plate at one side, and at a lower level below the projecting portion 17 of the upper plate at the other side.

The attaching plate 27, which has holes 28 in its corners for attachment to the article to be supported by the caster, is provided at its under side with a circular stud 29 of slightly less diameter than the circular opening provided by the portions 16 and 22, and adapted to fit therein, a laterally extending flange 30 being provided at its upper end which extends above the projecting portion 17 of the upper plate, and is of a diameter substantially corresponding to that of the portions 15 and 21. A plate 31 of substantially the same diameter as the flange 30 is provided at the under side of the stud 29, and extends beneath the projecting portion 23 of the lower plate. The stud 29 and plate 31 are assembled to the attaching plate 27 by a center bolt 32, or other suitable means may be employed.

A ball race consisting of semi-circular portions at two levels is thus formed, the projecting portion 17 of the upper plate forming the upper side of the race portion of which the plate 31 forms the under side, while the projecting portion 23 of the lower plate forms the under side of the race portion of which the flange 30 forms the upper side, the beveled ends 18, 24 and 19, 25 constituting ramp-like portions connecting the two levels. Anti-friction balls 33 are provided in the race.

The operation is as follows:—The offset of the horn produces an upward thrust at the side at which the wheel axis is disposed, pressing the balls at this side upwardly against the flange 30 through the upward pressure of the projecting portion 23 of the lower plate, at the same time producing a downward thrust at the opposed side, pressing the balls at this side downwardly against the plate 31 through the downward pressure of the projecting portion 17 of the upper plate. The entire load and thrust is thus supported at all times upon the balls. There is no appreciable pressure on the balls at the ramp portions so that during swiveling they will move freely from one level to the other, and their rotational directions are such that they roll up at one side and down at the other.

In Fig. 6 we have illustrated a modification in which roller bearings 34 are employed, instead of balls, the construction and operation being otherwise the same.

In Fig. 7 we have shown a crane, embodying the invention, and in which the crane arm 10a is shown provided with a weight 35, the action of the weight on the bearing being similar to the action of the load in the caster embodiment.

In Figs. 8 to 10 we have illustrated a modification of the invention, also shown, for example, as embodied in a caster, and which comprises a horn 40, which may be in the form of a casting, drop-forging or of other suitable construction, in which a wheel 41 is mounted upon an axle 42. The horn top is provided with a circular opening 43 surrounded forwardly, that is, in the direction of the offset of the wheel axis, by a segmental flange 44 having an upwardly directed bearing surface 45 curved into the inner surface 46 of an upwardly extending rib 47 adapted to confine the balls against outward lateral movement. The opening 43 is surrounded rearwardly by a segmental flange 48 vertically offset above the flange 44, and having a downwardly directed bearing surface 49 curved into the cylindrical inner surface 50 of the rear wall portion 51 of the horn top. The ends of the flanges 44 and 48 are beveled, as at 52 and 53, preferably at an angle of 45°, and are spaced to provide a passageway or ramp 54 connecting the ball space at the upper side of the flange 44 with the ball space at the under side of the flange 48 and through which the balls are adapted to move from one level to the other as the caster swivels. The axis of the wheel axle 42 is in a vertical plane forwardly of the circumferential center line of the ball-race. The flange 44 is of greater extent circumferentially than the flange 48, in substantial proportion to the greater load and wear on this bearing portion, the radial centers of the passage ways 54 being preferably about 20° rearwardly of the transverse diametric line of the horn top parallel to the wheel axis.

The attaching plate 55 is provided with a central post 56 adapted to be engaged in the opening 43 of the horn top for relative rotational movement, and at the under side of the plate there is provided a continuous circular bearing surface 57, vertically opposed to the bearing surface 45 of the flange 44 and curved into the outer cylindrical surface 58 of the post, which confines the balls against inward lateral movement. It will be noted that the upper surface 59 of the flange 48 clears the surface 57 and is inclined, so that there will be no chance of contact, even after excessive wear.

Upon the lower end of the post 56 is engaged a circular bearing plate 60 secured by a bolt or stud 61, preferably headed at its lower end and riveted over at its upper end within the central recess 62 of the plate 55. This plate 60 projects beyond the post beneath the flange 44 and engages and supports those balls of the single circumferential row of balls 63 disposed beneath the flange 48, serving the double purpose of retaining the parts in assembled relation and providing a continuous circular bearing surface for co-operation with the balls during their engagement with the flange 48. One or more shim washers 64 may be arranged between the post 56 and the plate 60 for adjustment purposes.

The operation of this embodiment is as follows:—The offset of the horn produces an upward thrust at the side at which the wheel axis is disposed, the load being taken at one side between the bearing surface 45 of the flange 44 and the opposed bearing surface 57 of the plate 55, and being taken at the other side between the bearing surface 49 of the flange 48 and the bearing plate 60, the ball or balls at the central portion of the flange 44 acting as a fulcrum about which the horn top tends to move upwardly at the front or wheel axis end and downwardly at the rear.

During swiveling the balls 63 move through the passageways or ramps 54 from one level to the other, the balls in the areas contiguous to said ramps being practically free of load, so that there is no impairment to their free movement. It will be observed that in practice the bearing surfaces or races 45 and 49 of the horn top are at a slight angle, and the arrangement of the ramps 54 rearwardly of the transverse diametric line of the horn top is such that the space between the ends of the flanges 44 and the bearing surface 57 widens as the angularity is increased, so that there is no possibility of binding the balls at these points, even after excessive wear or when the parts are very loosely adjusted.

Under certain heavy duty conditions it is desirable to take the load on a greater number of balls than is the case where relatively light loads are to be supported. By decreasing the angularity of the horn top bearing surfaces the number of balls in contact with the flanges 44—48 take load when the horn top bearing surfaces are parallel to the continuous bearing surfaces 57 and 60.

In Fig. 11 we have shown a modification in which the angularity is increased and the smaller number of balls put under load by decreasing the distance between the central plane of the upper balls in contact with the flange 44 and the central plane of the lower balls in contact with the flange 48. In this case the distance between the planes of the bearing surfaces 45 and 49 is increased, bringing the upper and lower ball levels closer, and increasing the angularity of the bearing surfaces 45 and 49 of the horn top. By comparison with the form shown in Fig. 14 it will be observed that in this Fig. 14 form the planes of the bearing surfaces 45 and 49 are closer, the ball levels are increased in distance, and the angularity of the horn top decreased, putting more balls under load.

In Fig. 12 we have shown the effect upon the ball-races after considerable wear has taken place. In this case the balls have worn both into the continuous races 57 and 60, as at 65 and 66, and into the segmental races 45 and 49 of the flanges 44 and 48, as at 67 and 68, the wear indicated at 65 and 67 being greater than at 66 and 68 due to the greater load taken at these points. The greater circumferential extent of the flange 44 to the flange 48 is substantially proportionate to this difference in load, so that even after very long usage the ball contact relation between the segmental and continuous bearing portions is not materially changed and the functioning and efficiency of the caster will remain practically constant. It will be observed that the free ball area is maintained constant and fixed during normal use and wear of the caster, because of the proportioning of the segmental bearing surfaces to the actual duty of these surfaces, the free ball area being practically at a neutral position, that is a position between the upward movement caused by the wear on the forward or wheel axis side, which is relatively great, due to the greater load, and the relatively smaller downward movement on the side taking the lighter load.

Thus, if there was equal wear on both the forward and rearward segments the tilting of the caster would be equal in front and rear, and lines through the ball centers of the front and rear balls, showing different degrees of tilt, would always intersect at a common point on the central axis of the caster. Where the wear is greater at the forward side, however, these lines would not intersect on the central axis of the caster, but at a point to the rear, or toward the bearing surface carrying the lighter load, and it is this point which determines the extent of the forward and rearward bearing surfaces. In Fig. 12 the dot-and-dash line $x$ connects the ball centers of the front and rear balls, also indicated in dot-and-dash lines, before any wear has taken place, and the dotted line $v$ connects the ball centers after considerable wear. It will be noted that the tilting planes indicated by these lines intersect at a point substantially coincident with the rearwardly offset positions of the passage-ways or ramps 54, and that this intersection point remains practically constant.

In Fig. 13 we have shown the effect where there is a very loose assembly between the horn top and the continuous bearing surface portions. Here again the general relationship between the segmental and continuous bearing surfaces is not materially changed and nothing takes place that would interfere with the efficiency of the bearing in action. In this case the angularity of the horn top bearing surfaces is slightly increased.

The conditions that are illustrated in Figs. 12 and 13 are those that are met in general bearing practice, one being the effect of wear, and the other the effect of variations of manufacturing tolerances in adjustment, or mal-adjustment. In either case the bearing will function properly. As pointed out in connection with the illustration in Fig. 11 the design can be modified so as to regulate the number of balls under load, and once this regulation is made the cooperate relationship between the bearing parts will remain practically constant during the normal life of the bearing. The provision of the relatively long segmental bearing surface 45 and the relatively short segmental bearing surface 49 not only compensates for the load imposed on these surfaces, but maintains the free ball area between the load supporting points practically constant irrespective of wear or mal-adjustment.

In Fig. 14 we have illustrated the action of the forces applied to the caster in both the static condition and when in motion. Considering that the load is taken at the wheel axis the major load is in a vertical direction indicated by the arrow $a$ and is reacted by two forces at the top of horn, the first, indicated by the arrow $b$, being directed toward the bearing surface 45 of the flange 44 in the opposite direction to the force line $a$ and in parallel relation to the swiveling axis, and the other, indicated by the arrow $c$, being in the opposite direction to the force line $b$ and directed toward the segmental bearing surface 49 of the flange 48. These three forces are in equilibrium, the point indicated by the arrow $b$ being in reality a fulcrum point, and when the caster for example, is stationary, are the only forces exerted.

When the caster or other movable structure in which the bearing is embodied starts in motion a force is exerted at the axle in a horizontal direction away from the swiveling axis, as indicated by the arrow $d$. This force causes the rotatable part to swivel into position and introduces a force, indicated by the arrow $e$, directed against the bearing surface 50 of the wall portion 51. The magnitude of this force $e$ is in proportion to the magnitude of the horizontal force *d* applied at the wheel axis and is resisted by the bearing surface 58 of the part 56.

In Figs. 15 to 18 we have shown a further modification of the invention, and also shown by way of example, embodied in a caster, which comprises a horn 70 which may be in the form of a casting, drop-forging or of other suitable construction, in which the wheel 71 is mounted on an axle 72. The horn top is provided with a circular opening 73, and in the upper surface in outwardly spaced concentric relation to said opening there is provided a segmental ball-race groove 74 of substantially semi-circular cross-section. This groove 74 is disposed in the forward portion of the top, that is in the direction of the offset of the wheel axis and extends rearwardly of the transverse diametric line of the horn top about 20° on each side, where its ends terminate in circular passage-ways as ramps at the under side of the top with the ends of a segmental ball-race groove 76, also of substantially semi-circular cross-section. The passage-ways or ramps 75 are of such size that the balls will move freely through them from one level to the other as the caster swivels. The greater circumferential extent of the groove 74 with respect to the groove 76 is in substantial proportion to the greater load and wear on the forward portion of the horn, as will hereinafter more fully appear. The under surface of the horn top is projected beneath the groove 74, providing a segmental rib 77, and the upper surface is projected about the groove 76, providing a segmental rib 78. The axis of the wheel axle 72 is in a vertical plane forwardly of the circumferential center line of the ball-race.

The attaching plate 79 is provided with a central post 80 adapted to be engaged in the opening 73 of the horn top for relative rotational movement, and at the under side of the plate there is provided a continuous circular ball-race groove 81, vertically opposed to the segmental groove 74 of the horn top. It will be noted that the rib 78 projects into the groove 81 with sufficient clearance, so that it will not contact.

Upon the lower end of the post 80 is engaged a circular bearing plate 82 secured by a bolt or stud 83, preferably headed at its lower end and riveted over at its upper end within the central recess 84 of the plate 79. This plate 82 projects beyond the post beneath the ball-race grooves of the horn top, and is provided with a continuous ball-race groove 85 vertically opposed to the segmental groove 76, and engages and supports those balls of the single circumferential row of balls 86 disposed in the groove 76. The plate 82 serves the double purpose of retaining the parts in assembled relation and providing a continuous ball-race for cooperation with the lower level balls in engagement with the groove 76. One or more shim washers 87 may be arranged between the post 80 and the plate 82 for adjustment purposes.

The operation is as follows:—The offset of the horn produces an upward thrust at the side at which the wheel axis is disposed, the load being taken at one side between the segmental ball-race bearing groove 74 of the horn top and the opposed continuous ball-race bearing groove 81 of the plate 79, and being taken at the other side between the segmental ball-race bearing groove 76 of the horn top and the opposed continuous ball-race bearing groove 85 of the plate 82, the ball or balls at the central portion of the groove 74 acting as a fulcrum about which the horn top tends to move upwardly at the front or wheel axis end and downwardly at the rear, so that in practice the segmental ball race grooves of the horn top are at a slight angle. During swiveling the balls 86 move through the passage-ways or ramps 75 from one level to the other, the balls in the areas contiguous to said ramps being free of load because of the slight angle of the horn top, so that there is no impairment to their free movement. In moving through the passage-ways or ramps 75 the balls are entirely enclosed by the horn top and consequently are out of contact with any relatively moving bearing surfaces. The deep setting of the balls in the grooves results in arc contact, so that there is reduced penetration, less wear, and side strains are effectively taken in all directions. The vertical thrust being much greater under ordinary conditions than the side or horizontal thrust perfect circumferential alignment and centralization of the parts results.

It will be observed that the free ball area contiguous to the passage-ways or ramps 75 is maintained constant and fixed during normal use and wear of the caster, because of the proportioning of the segmental bearing grooves to the actual duty of these grooves.

In Figs. 19 to 21 we have illustrated a further modification in which the plate 82 is provided with a flat continuous bearing surface 88 for engaging and supporting the lower level balls in engagement with the segmental groove 76. The ball-race groove 76 extends downwardly about the balls to a point contiguous to the plate 82. In this embodiment the side thrust and centralization is taken only by the upper level balls in engagement with the segmental ball-race groove 74 and the continuous ball-race groove 81.

We have illustrated and described preferred and satisfactory embodiment of the invention, but it will be obvious that changes may be made therein within the spirit and scope thereof as defined in the appended claims.

Having thus described our invention what we claim and desire to secure by Letters Patent is:—

1. In a swivel assembly, an element comprising opposed annular bearing surfaces, a continuous row of antifriction rotary means disposed between said opposed annular bearing surfaces, an element comprising diametrically opposed oppositely directed bearing surfaces interposed between said annular bearing surfaces and adapted to press said antifriction means at two diametrically opposite points in opposed predetermined directions against the respective annular bearing surfaces, and whereby a load exerting resultant forces in said predetermined directions and in a plane through said diametrically opposite points is taken by said antifriction means at said points and in the direction of said forces.

2. In a swivel assembly, a pair of rotatably connected swivel elements, annular race-forming means between said elements, a continuous row of anti-friction means engaging said race, and means adapted to press said anti-friction means in one direction at a point at one side of the swiveling axis along a line substantially parallel to said swiveling axis and in an opposed direction at a diametrically opposed point at the other side of the swiveling axis.

3. In a swivel assembly, a pair of rotatably connected swivel elements, one of said elements comprising an annular race having bearing surfaces opposed to each other in a direction parallel to the swiveling axis, a single series of antifriction rotary means disposed between said bearing surfaces, said other element comprising means adapted to press said antifriction means in one direction against one of said bearing surfaces at a point at one side of the swiveling axis, and in an opposed direction and against the other of said bearing surfaces at a diametrically opposed point at the other side of the swiveling axis.

4. In a swivel assembly, a pair of rotatably connected swivel elements, one of said elements comprising an annular race having laterally disposed bearing surfaces opposed to each other, a single series of antifriction rotary means disposed between said bearing surfaces, said other element comprising means adapted to press said antifriction means in one direction against one of said bearing surfaces at a point at one side of the swiveling axis and in an opposed direction and against the other of said bearing surfaces at a diametrically opposed point at the other side of the swiveling axis.

5. In a swivel assembly, a pair of rotatably connected swivel elements, one of said elements comprising a continuous annular race having opposed continuous annular bearing surfaces, a series of antifriction rotary means disposed between and in rolling contact with said bearing surfaces, said other element comprising non-continuous bearing means adapted to press said antifriction means in one direction against one of said bearing surfaces at a point at one side of the swiveling axis, and against the other of said bearing surfaces at a point at the other side of the swiveling axis.

6. A swivel thrust bearing assembly capable of sustaining relatively great eccentric loads comprising an element having a pair of oppositely facing annular bearing surfaces lying in planes perpendicular to the swiveling axis, a second element rotatable with respect to said first element, said second element having a pair of bearing surfaces arcuate in shape and disposed upon opposite sides of the swiveling axis, said last named bearing surfaces facing in opposite directions and lying in spaced planes substantially perpendicular to the swiveling axis, and rolling anti-friction means disposed between the bearing surfaces on said second element and the opposed portions of the bearing surfaces on said first element.

7. A swivel bearing adapted to support an eccentric load comprising a pair of relatively rotatable members and a single set of rolling anti-friction elements operably interposed between said members, a number of said elements transmitting forces from one member to the other in lines substantially parallel to the swiveling axis, a portion of said number transmitting said forces in one direction and the others of said number transmitting the forces in the opposite direction.

8. A swivel bearing adapted to support an eccentric load comprising a pair of relatively rotatable members having cooperating surfaces forming a ball race, said ball race having diametrically opposite portions thereof in different planes perpendicular to the axis of the race, a continuous row of ball bearings positioned within said race, and means operable upon relative rotation of said members successively to shift said ball bearings from one of said portions of said race to the other.

9. An anti-friction bearing including a pair of relatively rotatable members having a raceway therebetween, said raceway having portions thereof lying in adjacent parallel planes and at opposite sides of the axis of rotation, a series of anti-friction elements in said raceway, and means for guiding said elements and transmitting pressure from one of said members to the other through said elements in opposite directions upon the opposite sides of the axis of rotation of said members.

10. In a swivel bearing, the combination of a pair of relatively rotatable members, one of said members having a ball bearing raceway formed therein, the other of said members having flange means projecting into and forming a part of said race-way, a plurality of rolling anti-friction elements in said raceway, said flange means having a bearing surface above said elements and bearing downwardly thereupon, and having a bearing surface below said elements and bearing upwardly thereagainst and means whereby said elements are shiftable from one of said bearing surfaces to the other as said members are relatively rotated.

11. In an anti-friction bearing, a pair of relatively rotatable members, a continuous row of rolling anti-friction elements therebetween, and one of said members including a pair of bearing forming means, one of said means being arranged to pass beneath said elements and the other of said means being arranged to pass over said elements; upon relative rotation of said members, said pair of bearing forming means respectively extending radially beneath and beyond and above and beyond the vertical axes of said elements.

12. An anti-friction bearing including a substantially circular series of anti-friction elements, a portion of said elements lying in one plane and another portion lying in a separate and parallel pane, and means for guiding and applying pressure to said elements in both of said planes.

13. An anti-friction bearing including a series of movable members, means for guiding said members in a first plane, means for guiding said members in a second plane, means for transferring said members from one plane to the other, and means for applying pressure to said members in both of said planes.

14. In an anti-friction bearing, a series of rotatable members, several of said members lying in one plane while others of said members lie in a different plane, means for guiding said members in said planes and for shifting said members from one plane to the other, and means for applying loads only to members lying in said one plane and to members lying in said different plane.

15. In a swivel assembly, a pair of rotatably connected swivel elements, a continuous row of rotatable members disposed between said elements and surrounding the swiveling axis of said members, a number of said members lying in a first plane and a lesser number lying in a different plane, and means for guiding said members in said planes and for shifting said members from one plane to the other.

16. In a swivel assembly, a pair of rotatably connected swivel elements, race forming means between said elements, a series of rotatable members engaging said race forming means, and means adapted to impose a load on a number of said members in one direction at one side of the swiveling axis and on a lesser number in another direction at the other side of the swiveling axis.

17. In a swivel assembly, a pair of rotatably connected swivel elements, race forming means between said elements, a series of rotatable members engaging said race forming means, and means adapted to impose a load on a number of said members in one direction at one side of the swiveling axis and on others in another direction at the other side of the swiveling axis, said last named means being of different extent and substantially proportioned to the differential load imposed at opposite sides of the swiveling axis.

18. In a swivel assembly, a pair of rotatably connected swivel elements, circular bearing means associated with one of said elements, rotatable members engaging said bearing means, and means associated with the other element comprising a segmental portion in excess of 180° adapted to press said rotatable members in one direction with respect to said bearing means at one side of the swiveling axis, and a segmental portion less than 180° disposed in axially offset relation to said first segmental portion and adapted to press said rotatable members in another direction with respect to said bearing means at the other side of the swiveling axis.

19. In a swivel assembly, a pair of rotatably connected swivel elements, circular bearing means associated with one of said elements comprising vertically opposed continuous circumferential bearing surfaces, rotatable members engaging said bearing surfaces, and means associated with the other element comprising a segmental portion in excess of 180° adapted to press said rotatable members in one direction with respect to one of said continuous bearing surfaces at one side of the swiveling axis, and a segmental portion less than 180° disposed in axially offset relation to said first segmental portion and adapted to press said rotatable means in another direction with respect to the other of said continuous bearing surfaces at the other side of the swiveling axis.

20. In a swivel assembly, a pair of rotatably connected swivel elements, rotatable members disposed between said elements, a number of said members lying in a first plane and others lying in a different plane, and means for guiding said members in said planes and for shifting said members from one plane to the other, said guiding means adapted to impose side thrust in all directions transverse to the swiveling axis on said rotatable members.

21. In a swivel assembly, a pair of rotatably connected swivel elements, circular bearing means associated with one of said elements and including a continuous circumferential race-groove having side walls, a continuous row of rotatable members engaging said bearing means and adapted to engage said race-groove whereby they are confined against both inward and outward radial movement, and means associated with the other element adapted to press a number of said members in one direction with respect to said bearing means at one side of the swiveling axis and others in another direction at the other side of the swiveling axis.

22. In a swivel assembly, a pair of rotatably connected swivel elements, circular bearing means associated with one of said elements and including a pair of opposed continuous circumferential race-grooves having side walls, a continuous row of rotatable members engaging said bearing means and adapted to engage said race-grooves whereby they are confined against both inward and outward radial movement, and means associated with the other element adapted to press a number of said members in one direction with respect to said bearing means at one side of the swiveling axis and others in another direction at the other side of the swiveling axis.

23. In a swivel assembly, a pair of rotatably connected swivel elements, circular bearing means associated with one of said elements, a continuous row of rotatable members engaging said bearing means, and means associated with the other element adapted to press a number of said members in one direction with respect to said bearing means at one side of the swiveling axis and others in another direction at the other side of the swiveling axis and including a race-groove along which said members have rolling engagement and adapted to confine said members in engagement therewith against both inward and outward radial movement.

24. In a swivel assembly, a pair of rotatably connected swivel elements, circular bearing means associated with one of said elements and including a continuous circumferential race-groove having side walls, a continuous row of rotatable members engaging said bearing means, and adapted to engage said race-groove whereby they are confined against both inward and outward radial movement, and means associated with the other element adapted to press a number of said members in one direction with respect to said bearing means at one side of the swiveling axis and others in another direction at the other side of the swiveling axis, and including a race-groove opposed to said first mentioned race-groove and along which said members have rolling engagement.

25. In a swivel assembly, a pair of rotatably connected swivel elements, circular bearing means associated with one of said elements, a continuous row of rotatable members engaging said bearing means and means associated with the other element adapted to press a number of said members in one direction with respect to said bearing means at one side of the swiveling axis and others in another direction at the other side of the swiveling axis and including a pair of segmental race-grooves, one facing in one direction and the other facing in the opposite direction, and each adapted to confine said members in engagement therewith against both inward and outward radial movement.

26. In a swivel assembly, a pair of rotatably connected swivel elements, circular bearing means associated with one of said elements and including a continuous circumferential race-groove having side walls, a continuous row of rotatable members engaging said bearing means, and adapted to engage said race-groove whereby they are confined against both inward and outward radial movement, and means associated with the other element adapted to press a number of said members in one direction with respect to said bearing means at one side of the swiveling axis and others in another direction at the other side of the swiveling axis, and including a segmental race-groove, opposed to said first mentioned race-groove, and along which said members have rolling engagement.

27. In a swivel assembly, a pair of rotatably connected swivel elements, circular bearing means associated with one of said elements and including a continuous circumferential race-groove having side walls, a continuous row of rotatable members engaging said bearing means, and adapted to engage said race-groove whereby they are confined against both inward and outward radial movement, and means associated with the other element adapted to press a number of said members in one direction with respect to said bearing means at one side of the swiveling axis and others in another direction at the other side of the swiveling axis, and including a segmental race-groove in excess of 180° opposed to said first mentioned race-groove, and along which said members have rolling engagement.

28. In a swivel assembly, a pair of relatively rotatable members, a continuous row of rolling anti-friction elements therebetween, and one of said members including a pair of bearing forming means, one of said means being arranged to pass beneath said elements and the other of said means being arranged to pass over said elements, and said member also including passageways through which said anti-friction elements pass from one of said bearing forming means to the other, said passageways being formed entirely within the body of said member.

29. In a swivel assembly, a pair of rotatably connected swivel elements, bearing means disposed between said elements, said means lying partially at the obverse side of one of said elements and adapted to take load in one direction and partially at the reverse side of said element and adapted to take load in another direction, and means for shifting said bearing means from one of said sides to the other.

30. In a swivel assembly, a pair of rotatably connected swivel elements, bearing means disposed between said elements, said means lying partially at the obverse side of one of said elements and at one side of the swiveling axis and partially at the reverse side of said element and at the opposite side of the swiveling axis, and means for shifting said bearing means from one of said sides to the other.

31. In a swivel assembly, a pair of rotatably connected swivel elements, bearing means disposed between said elements, said means lying partially at the obverse side of one of said elements and adapted to take load in one direction and partially at the reverse side of said element and adapted to take load in another direction, and means for guiding said bearing means at said obverse side and at said reverse side of said element and from one of said sides to the other.

32. In a swivel assembly, a pair of rotatably connected swivel elements, bearing means disposed between said elements, said means lying partially at the obverse side of one of said elements and partially at the reverse side of said element, and means for guiding said bearing means at said obverse side and at said reverse side of said element and from one of said sides to the other, said guiding means adapted to impose side thrust transverse to the swiveling axis on said bearing means.

33. In a swivel assembly, a pair of rotatably connected swivel elements, circular race-forming means connected to one of said elements, antifriction means engaging said race, and means connected to said other element comprising a segmental portion adapted to press said antifriction means in one direction with respect to said race at one side of the swiveling axis, and a segmental portion adapted to press said antifriction means in another direction with respect to said race at the other side of the swiveling axis.

34. In a swivel assembly, a pair of rotatably connected swivel elements, circular race-forming means connected to one of said elements, antifriction means engaging said race, and means connected to said other element comprising a segmental portion adapted to press said antifriction means in one direction with respect to said race at one side of the swiveling axis, and a segmental portion disposed in axially offset and diametrically opposed relation to said first segmental portion and adapted to press said antifriction means in another direction with respect to said race at the other side of the swiveling axis.

35. In a swivel assembly a pair of rotatably connected swivel elements, circular race-forming means connected to one of said elements including a pair of spaced and opposed circular bearing portions, antifriction means engaging said race, and means connected to said other element comprising a segmental portion disposed in said race and adapted to press said balls against one of said bearing portions at one side of the swiveling axis, and a segmental portion engaged in said race disposed in axially offset and diametrically opposed relation to said first segmental portion and adapted to press said antifriction means against said other bearing portion at the other side of the swiveling axis.

36. In a swivel assembly, a pair of rotatably connected swivel elements, circular race-forming means connected to one of said elements including a pair of spaced and opposed circular bearing portions, antifriction means engaging said race, and means connected to said other element comprising a segmental portion disposed in said race and adapted to press said balls against one of said bearing portions at one side of the swiveling axis, and a segmental portion engaged in said race disposed in axially offset and diametrically opposed relation to said first segmental portion and adapted to press said antifriction means against said other bearing portion at the other side of the swiveling axis, said segmental portions each having opposed ramp portions at their ends whereby the antifriction means move from one to the other.

Signed at Bridgeport, county of Fairfield, and State of Connecticut, this 31st day of July, 1931.

WALTER F. HEROLD.
EMIL E. KNITTEL.